United States Patent
Rubinstein

(10) Patent No.: US 9,942,732 B2
(45) Date of Patent: Apr. 10, 2018

(54) TRIGGERING ACTIONS WITH MOBILE MESSAGES

(71) Applicant: Microsoft Technology Licensing, LLC, Redmond, WA (US)

(72) Inventor: Mark Rubinstein, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/206,221

(22) Filed: Jul. 9, 2016

(65) Prior Publication Data

US 2018/0014167 A1      Jan. 11, 2018

(51) Int. Cl.
| | |
|---|---|
| *H04W 4/12* | (2009.01) |
| *H04M 1/725* | (2006.01) |
| *H04M 11/00* | (2006.01) |
| *H04W 68/00* | (2009.01) |

(52) U.S. Cl.
CPC ......... *H04W 4/12* (2013.01); *H04M 1/72519* (2013.01); *H04M 11/007* (2013.01); *H04W 68/005* (2013.01)

(58) Field of Classification Search
CPC .......... H04W 4/12; H04W 4/14; H04W 4/02; H04W 4/16; H04W 4/08; H04W 8/26; H04W 4/021; H04W 4/023; H04W 68/00; H04W 28/18
USPC ... 455/412.1, 412.2, 413, 414.1, 414.2, 417, 455/445, 466
See application file for complete search history.

(56) References Cited

U.S. PATENT DOCUMENTS

| | | | |
|---|---|---|---|
| 8,190,213 B2 | 5/2012 | Sierawski | |
| 9,559,991 B1* | 1/2017 | Wieber | ................... H04L 51/02 |
| 2002/0187794 A1 | 12/2002 | Fostick et al. | |
| 2006/0023674 A1* | 2/2006 | Goring | ................... H04L 51/14 |
| | | | 370/338 |
| 2007/0143429 A1* | 6/2007 | Venkataraman | .. H04M 1/72547 |
| | | | 709/206 |
| 2007/0201634 A1 | 8/2007 | Bonnaud et al. | |
| 2007/0238474 A1 | 10/2007 | Ballas et al. | |

(Continued)

FOREIGN PATENT DOCUMENTS

| | | |
|---|---|---|
| WO | 2010133830 A1 | 11/2010 |
| WO | 2014026436 A1 | 2/2014 |

*Primary Examiner* — Jean Gelin
(74) *Attorney, Agent, or Firm* — Alleman Hall Creasman & Tuttle LLP

(57) ABSTRACT

A mobile device may create a message rule to establish a causal relationship between a messaging activity and a device activity or vice versa. A message rule user interface displayed on the mobile device may receive from a user a message parameter, describing at least one of a message format and a message content of a hypothetical received mobile message. The message rule user interface also may receive a response action directive describing a device action to be performed by the mobile device in response to receiving an incoming mobile message corresponding to the message parameter. The mobile device may store a message target rule associating the message parameter with the response action directive. The mobile device may receive the incoming mobile message corresponding to the message parameter and execute the device action according to the response action directive.

20 Claims, 13 Drawing Sheets

(56) References Cited

U.S. PATENT DOCUMENTS

| | | | |
|---|---|---|---|
| 2009/0061833 A1* | 3/2009 | Ho | H04M 1/72552 455/414.2 |
| 2010/0255817 A1* | 10/2010 | Chen | G06Q 10/107 455/412.2 |
| 2011/0077033 A1 | 3/2011 | Shuai | |
| 2011/0320960 A1 | 12/2011 | Cai et al. | |
| 2012/0083287 A1 | 4/2012 | Casto et al. | |
| 2012/0135716 A1* | 5/2012 | Katpelly | H04W 4/185 455/414.1 |
| 2013/0097269 A1 | 4/2013 | Plotkin | |
| 2014/0051403 A1 | 2/2014 | Christensen | |
| 2014/0057610 A1 | 2/2014 | Olincy et al. | |
| 2015/0074202 A1 | 3/2015 | VanBlon et al. | |
| 2015/0133158 A1 | 5/2015 | Tofighbakhsh | |
| 2015/0195235 A1 | 7/2015 | Trussel et al. | |
| 2015/0281902 A1* | 10/2015 | Lehtiniemi | G06F 3/048 455/456.3 |
| 2015/0372954 A1* | 12/2015 | Dubman | H04L 51/12 709/206 |

\* cited by examiner

TRIGGERING ACTIONS WITH MOBILE MESSAGES

BACKGROUND

A user may send a text or multimedia message to another user using a variety of messaging formats. For example, a user may send a message using a mobile message, referring to a short message usually sent from a mobile telephone, a smart phone, or a tablet. The mobile message may be formatted for transmission over a mobile telephone network or an internet connection, as opposed to email which is strictly formatted for transmission over an internet connection. The mobile message may send text, such as in a short message service (SMS); other types of media, such as in a multimedia message service (MMS); or some combination of the two. A user may use a mobile message for quick messages that are to be read immediately by the user.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to using a message rule to establish a causal relationship between a messaging activity and a device activity or vice versa. A mobile message device may present a message rule user interface to the user to establish a message rule. The message rule user interface may receive from the user a message parameter describing at least one of a message format and a message content of a hypothetical mobile message received in a mobile messaging module. The message rule user interface may receive a response action directive describing a device action to be performed by the mobile message device in response to receiving an incoming mobile message matching the message parameter. The mobile message device may store a message target rule associating the message parameter with the response action directive. The mobile message device may receive the incoming mobile message matching the message parameter. The mobile message device may execute the device action in response to the incoming mobile message according to the response action directive.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION

Figure 1:
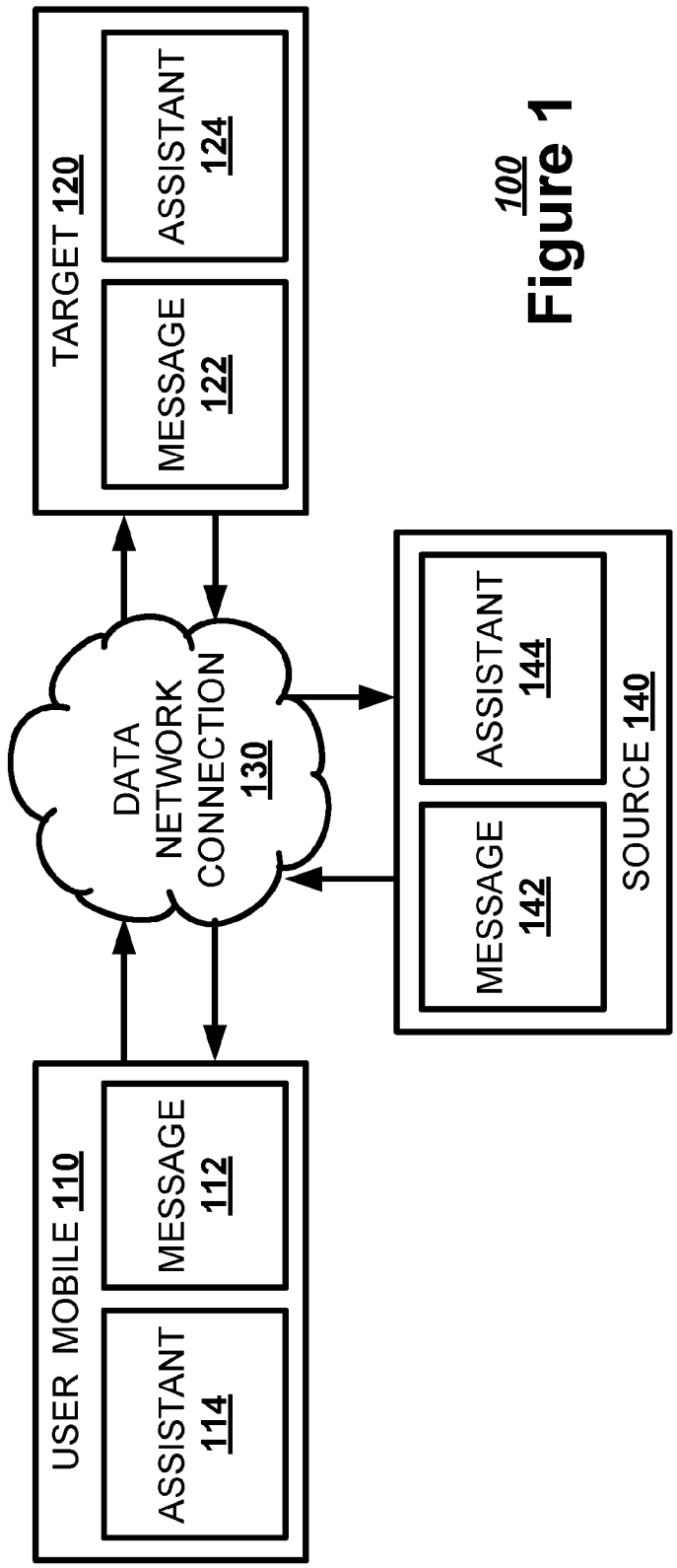
FIG. 1 illustrates, in a block diagram, one example of a mobile network.

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a mobile message device, a computing device, or a machine-implemented method.

In one example, a mobile message device may create a message target rule to establish a causal relationship between a messaging activity and a device activity. A mobile message device may present a message rule user interface to the user to establish a message rule. The message rule user interface may receive from the user a message parameter describing at least one of a message format and a message content of a hypothetical mobile message received in a mobile messaging module. The message rule user interface may receive a response action directive describing a device action to be performed by the mobile message device in response to receiving an incoming mobile message matching the message parameter. The mobile message device may store a message target rule associating the message parameter with the response action directive. The mobile message device may receive the incoming mobile message matching the message parameter. The mobile message device may execute the device action in response to the incoming mobile message according to the response action directive.

Alternately, the mobile message device may create a message source rule to establish a causal relationship between a device activity and a messaging activity. The message rule user interface may receive a trigger parameter from a user describing a hypothetical meta device event occurring internal to the computing device. The message rule user interface may receive from the user a message directive describing an outgoing mobile message to be sent upon an occurrence of a meta device event matching the trigger parameter. The mobile message device may store a message source rule associating the trigger parameter with the message directive. The mobile message device may identify the occurrence of the meta device event matching the trigger parameter. The mobile message device may send the outgoing mobile message upon the occurrence of the meta device event according to the message directive.

A smart assistant module of a mobile message device may use a message rule to establish a causal relationship between a message activity performed by a mobile messaging module and subsequent activity of the mobile message device. A smart assistant module is an application module, such as Siri® or Cortana®, that coordinates other application modules on the mobile message device to improve user experience. A mobile messaging module describes an application module performing a core function of mobile message, such as sending and receiving mobile messages, displaying the message, or alerting the user to the message. The smart assistant module may also use a message rule to establish a causal relationship between a device activity occurring in other application modules of the mobile message device and a message activity. The message rule may have a parameter describing a hypothetical event to identify a future actual occurrence of that event. The message rule may have a directive proscribing an action for the mobile message device to execute. A message parameter may describe an incoming mobile message. A response action directive may proscribe a device action to execute based on the incoming mobile message. Conversely, a trigger parameter may describe a meta device event occurring in an application module external to mobile messaging. A message directive may proscribe a format for an outgoing mobile message to be sent in response to the meta device event.

By having the user control the exact form of the message activity that may trigger these actions, the user may be able to control who has access to the features of the mobile device. The user gets to set what key words, phrases, or data items are included in the incoming message so that just trusted confidants may cause the mobile message device to perform these actions. Similarly, by allowing the user to specifically tailor the trigger parameter to describe a specific set of events, the user may tailor the user's own experience using the mobile device.

FIG. 1 illustrates, in a block diagram, one example of a mobile network 100. A user mobile message device 110 may implement a mobile messaging module 112 to send a mobile message to a target mobile message device 120 via a data network connection 130. The user mobile message device 110 may be a smart phone, a tablet, a game console, a smart watch, or other mobile device capable of sending mobile messages. The data network connection 130 may be a mobile telephone network, an Internet connection, a wide area network connection, a local area network connection, or other type of data network connection. Further, the user mobile message device 110 may implement the mobile messaging module 112 to receive a mobile message from a source mobile message device 140 via the data network connection 130.

The user mobile message device 110 may implement a smart assistant module 114, such as Siri® or Cortana®, to coordinate various modules to perform business and lifestyle functions. The smart assistant module 114 may provide both a graphic user interface and a verbal user interface to interact with a user. A user may use the smart assistant module 114 to compose or coordinate different types of mobile messages to be sent or received by the mobile messaging module 112.

The target mobile message device 120 may be a simple mobile device that just implements a mobile messaging module 122 to send and receive mobile messages. Alternately, the target mobile message device 120 may range in complexity to even be a smart phone, having a smart assistant module 124 to compose or coordinate different types of mobile messages to be sent or received by the mobile messaging module 122. The source mobile message device 140 may be a simple mobile device that just implements a mobile messaging module 142 to send and receive mobile messages. Alternately, the source mobile message device 140 may range in complexity to even be a smart phone, having a smart assistant module 144 to compose or coordinate different types of mobile messages to be sent or received by the mobile messaging module 142.

Figure 2:
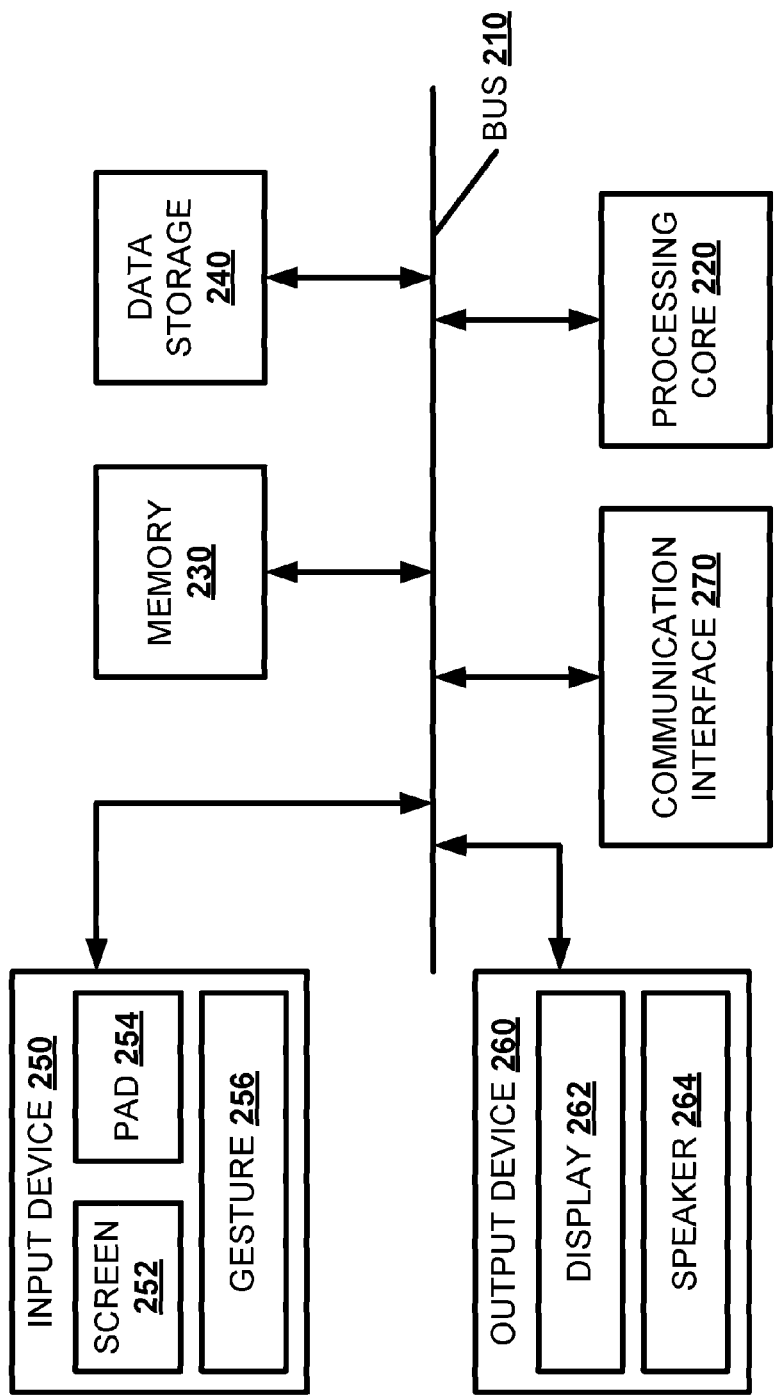
FIG. 2 illustrates, in a block diagram, one example of a computing device.

FIG. 2 illustrates a block diagram of an exemplary computing device 200 which may act as mobile message device. The computing device 200 may combine one or more of hardware, software, firmware, and system-on-a-chip technology to implement mobile message device. The computing device 200 may include a bus 210, a processing core 220, a memory 230, a data storage 240, an input device 250, an output device 260, and a communication interface 270. The bus 210, or other component interconnection, may permit communication among the components of the computing device 200.

The processing core 220 may include at least one conventional processor or microprocessor that interprets and executes a set of instructions. The processing core 220 may be configured to implement a smart assistant module to present a message rule user interface. The processing core 220 may be further configured to identify a source that sent an incoming mobile message. The processing core 220 may be also configured to select an application module to execute a device action based on a response action directive. The processing core 220 may be additionally configured to execute a device action in response to the incoming mobile message according to the response action directive.

The processing core 220 may be configured to select an application module to identify the meta device event. The processing core 220 may be further configured to identify an occurrence of the meta device event. The processing core 220 may be also configured to identify a target address to receive the outgoing mobile message. The processing core 220 may be additionally configured to incorporate a data output from at least one of a clock module, a calendar module, a location service module, and an address book module into the outgoing mobile message.

The memory 230 may be a random access memory (RAM) or another type of dynamic data storage that stores information and instructions for execution by the processing core 220. The memory 230 may also store temporary variables or other intermediate information used during execution of instructions by the processing core 220. The memory 230 may store a series of instructions that are executed by at least one processor to implement a smart assistant module. The memory 230 may be configured to store a message target rule associating the message parameter with the response action directive. The memory 230 may be further configured to store a message source rule associating the trigger parameter with the message directive.

The data storage 240 may include a conventional ROM device or another type of static data storage that stores static information and instructions for the processing core 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing user addresses, message target rules, and message source rules.

The input device 250 may include one or more conventional mechanisms that permit a user to input information to the computing device 200, such as a keyboard, a mouse, a voice recognition device, a microphone, a headset, a touch screen 252, a touch pad 254, a gesture recognition device 256, etc. The input device 250 may be configured to receive from a user via the message rule user interface a message parameter describing at least one of a message format and a message content of a hypothetical mobile message received in a mobile messaging module. The input device 250 may be further configured to receive from the user via the message rule user interface a response action directive describing a device action to be performed by the mobile message device in response to receiving an incoming mobile message matching the message parameter. The input device 250 may be also configured to receive from the user at least one of an active period parameter describing a time period when the message parameter is applied and an active location parameter describing a region where the message parameter is applied. The input device 250 may be additionally configured to receive a text string from the user describing at least one of a text and a text fragment of the incoming mobile message. The input device 250 may be further configured to receive an accompanying text to be sent in conjunction with the device action.

The input device 250 may be configured to receive from a user via a message rule user interface a trigger parameter describing a hypothetical meta device event occurring internal to the mobile message device. The input device 250 may be further configured to receive from a user via a message rule user interface a message directive describing an outgoing mobile message to be sent upon an occurrence of a meta device event matching the trigger parameter. The input device 250 may be also configured to receive from the user at least one of a time trigger parameter describing a time, a timer trigger parameter describing an expiration of a timer, a location trigger parameter describing a location, a proximity trigger parameter describing a proximity to a different mobile message device as the trigger parameter, and an extension trigger parameter describing a custom trigger event entered by the user.

The output device 260 may include one or more conventional mechanisms that output information to the user, including a display screen 262, a printer, one or more speakers 264, a headset, a vibrator, or a medium, such as a memory, or a magnetic or optical disk and a corresponding disk drive. The output device 260 may be configured to present a message rule user interface to the user to establish a message rule. The output device 260 may be further configured to present an address list to the user to allow selection of a source address or a target address. The output device 260 may be also configured to present a message parameter checklist to receive the message parameter. The output device 260 may be additionally configured to provide a text string to the user describing at least one of a text and a text fragment for selection as the message content. The output device 260 may be further configured to present an action directive checklist to receive the response action directive describing at least one of identifying a device location, causing the mobile message device to ring, forwarding the incoming mobile message, scheduling a meeting with the user, interacting with a smart assistant module, and activating an extension module added to the action directive checklist by the user. The output device 260 may be also configured to present a pre-populated accompanying text to be sent in conjunction with the device action to the user.

The output device 260 may be configured to present a trigger parameter checklist to receive the trigger parameter. The output device 260 may be further configured to provide a text string to the user describing at least one of a text and a text fragment for selection for inclusion in the outgoing message. The output device 260 may be also configured to present an output module checklist to identify an application module to provide a data output for inclusion with the outgoing mobile message.

The communication interface 270 may include any transceiver-like mechanism that enables computing device 200 to communicate with other devices or networks. The communication interface 270 may include a network interface or a transceiver interface. The communication interface 270 may be a wireless, wired, or optical interface. The communication interface 270 may be configured to receive an incoming mobile message matching a message parameter. The communication interface 270 may be configured to send an outgoing mobile message upon the occurrence of the meta device event according to the message directive.

The computing device 200 may perform such functions in response to processing core 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

Figure 3:
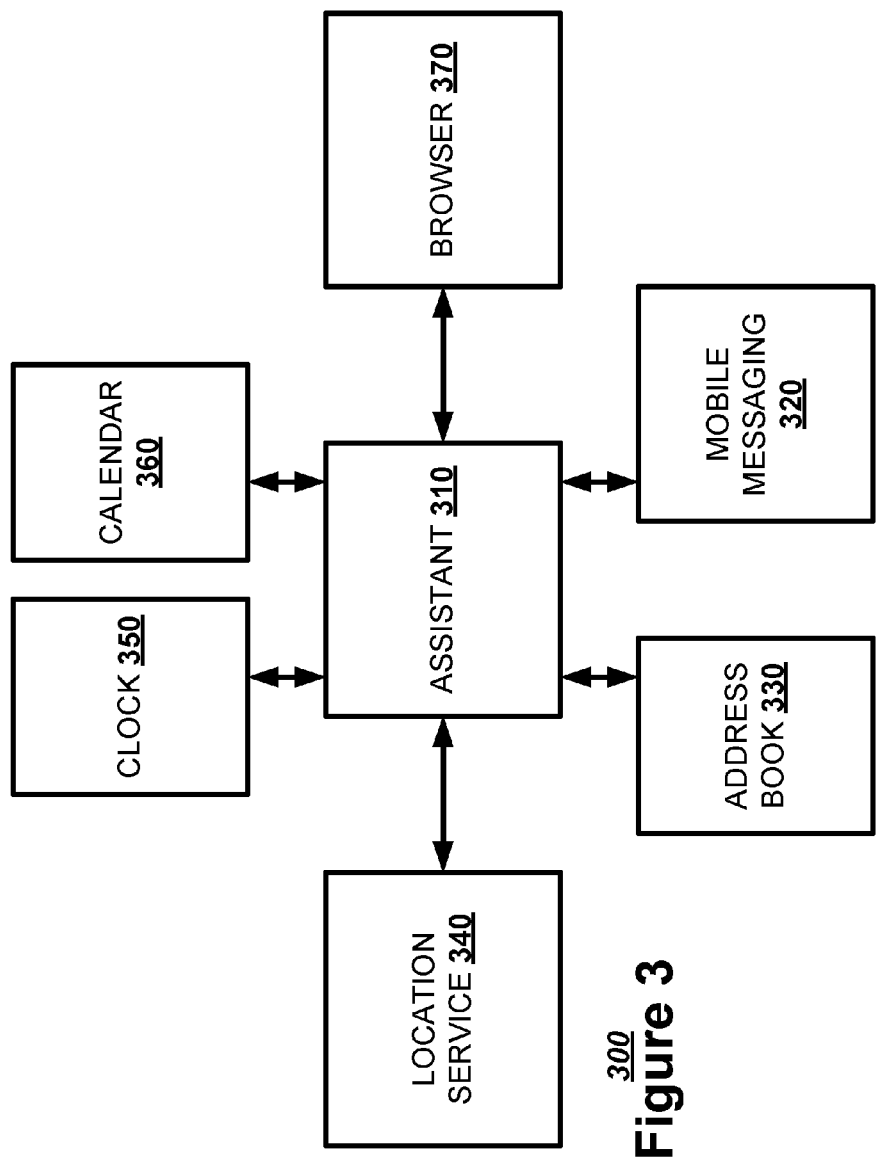
FIG. 3 illustrates, in a block diagram, one example of a mobile message device architecture.

FIG. 3 illustrates, in a block diagram, one example of a mobile device architecture 300. The mobile message device may have a smart assistant module 310 to coordinate interactions between different modules in the mobile message device. A mobile messaging module 320 may exchange mobile messages with other mobile message devices. The smart assistant module 310 may use a set of message source rules to send a mobile message with the mobile messaging module 320 upon identifying the occurrence of a trigger event. Further, the smart assistant module 320 may use a set of message target rules to perform a device action upon receiving a specified mobile message with the mobile messaging module 320. The smart assistant module 320 may identify a user from an address book 330 for the mobile message device to specify a message source rule or a message target rule.

The smart assistant module 310 may use different modules to determine whether to apply a message target rule or to identify a trigger event. The smart assistant module 310 may consult a location service module 340 to identify the location of the mobile message device. A location service module 340 may be a global positioning service module, a network triangulation module, or some other location service module. If the location is listed as a triggering location by the message source rule, the smart assistant module 310 may have the mobile messaging module 320 send a mobile message proscribed by the message source rule. Similarly, if the location is within a region listed by the message target rule as a constraint upon application of the message target rule, the smart assistant module 310 may initiate the proscribed device action upon receiving the proscribed mobile message in the message target rule.

Further, the smart assistant module 310 may consult a clock module 350 to determine the time at the location of the mobile message device. If the time is listed as a triggering time by the message source rule, the smart assistant module 310 may have the mobile messaging module 320 send a mobile message proscribed by the message source rule. Similarly, if the time is within a time period listed by the message target rule as a constraint upon application of the message target rule, the smart assistant module 310 may initiate the proscribed device action upon receiving the proscribed mobile message in the message target rule.

The smart assistant module 310 may use different modules to perform different device actions when receiving a mobile message proscribed by the user in the message target rule. The smart assistant module 310 may use the location service module 340 to determine a location to return in response to a query proscribed by the user. The smart assistant module 310 may access a calendar module 360 to access the schedule of the user. The smart assistant module 310 may return a response to an availability query when posed in a query format proscribed by the user.

The mobile message device may have a browser module 370 to access data on a web server over a data network. The browser module 370 may manage data from multiple pages at once. Another user with a simple mobile message device without a data plan providing internet access or a data plan providing limited internet access may access data available on the web by texting a query to the smart assistant module 310 on a smart phone. The smart assistant module 310 may then have the browser module 370 access the data on the web server. The mobile messaging module 310 may return the accessed data to the other user.

Figure 4:
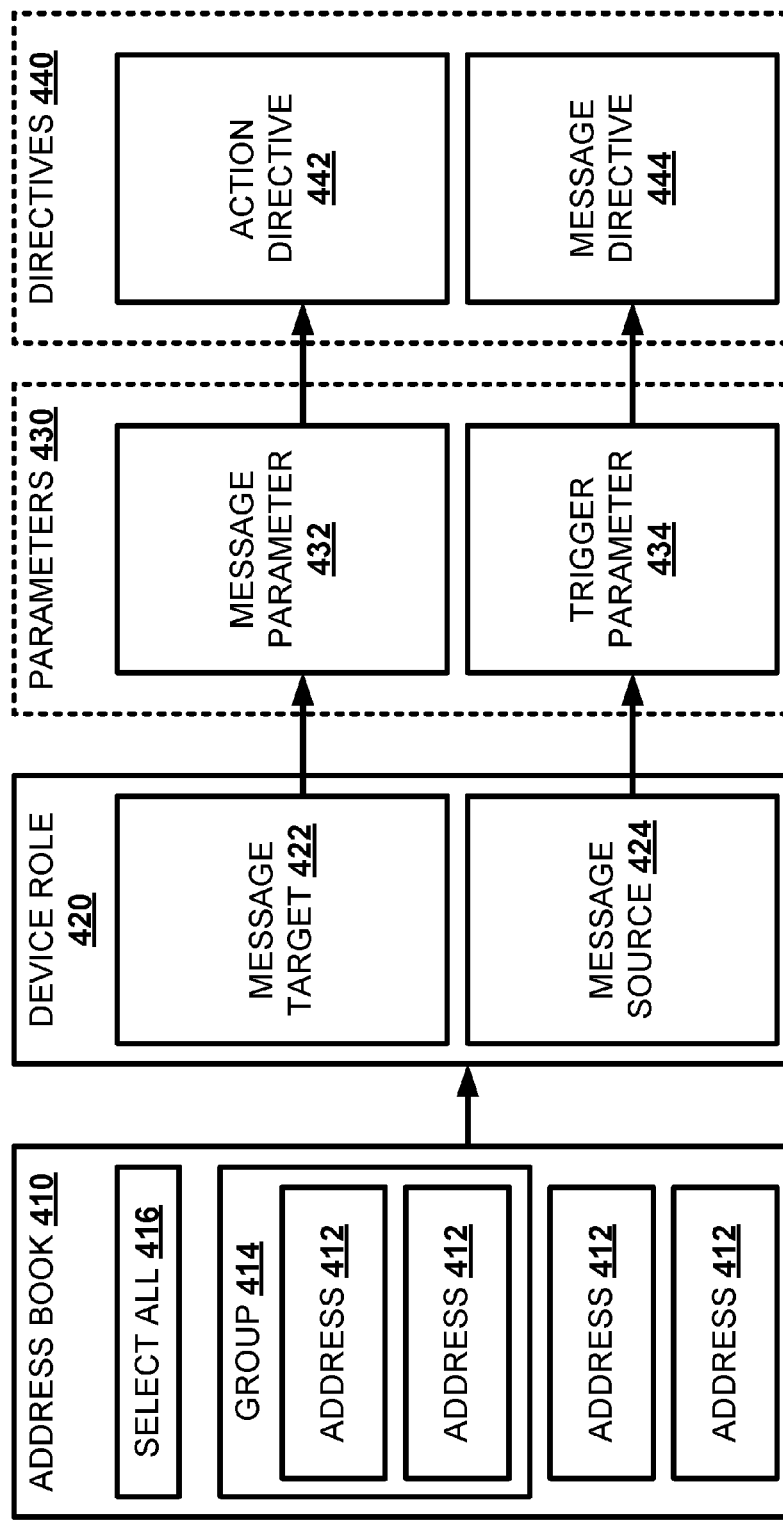
FIG. 4 illustrates, in a block diagram, one example of a message rule user interface.

The smart assistant module may present a message rule user interface to the user to allow the user to construct a message rule pairing a messaging event with a non-messaging event. The mobile message rule may describe either an outgoing mobile message triggered by a meta device event or a device action in response to an incoming mobile message. FIG. 4 illustrates, in a block diagram, one example of a message rule user interface 400. The message rule user interface 400 may present an address book page 410 to the user. The address book page 410 may present one or more mobile message addresses 412 for a messaging partner selected from an address book of the user. The address book page 410 may allow the user to select multiple mobile message addresses 412 to create a partner group 414, with the resulting message rule applying to each member of the partner group 414. The address book page 410 may have a "select all" button 416 to allow the user to select each mobile message address 412 in the address book, with the resulting message rule applying to each member of the address book.

The message rule user interface 400 may present a device role page 420 to the user. The device role page 420 may allow the user to select between the message target rule 422 and the message source rule 424. The message target rule 422 applies when the mobile message device receives an incoming mobile message. The message source rule 424 applies when a triggering event causes the mobile message device to send an outgoing mobile message.

The message rule user interface 400 may then present a parameter page set 430 and a directive page set 440. A parameter page set 430 may describe an inciting event for the mobile message device. A directive page set 440 may describe a responsive action to the inciting event. When the user has selected a message target rule 422, the message rule user interface 400 may present as part of a message target user interface a message parameter page set 432 to receive a message parameter describing at least one of a message format and a message content of a hypothetical mobile message received in a mobile messaging module. The message rule user interface 400 may present a response action directive page set 442 to receive a response action directive describing a device action to be performed by the mobile message device. When the user has selected a message source rule 424, the message rule user interface 400 may present as part of a message source user interface a trigger parameter page set 434 to receive a trigger parameter describing a hypothetical meta device event occurring internal to the computing device, as opposed to an external event, such as receiving a mobile message. The message rule user interface 400 may present a message directive page set 444 to receive a message directive describing an outgoing mobile message to be sent upon the hypothetical meta device event.

Figure 5:
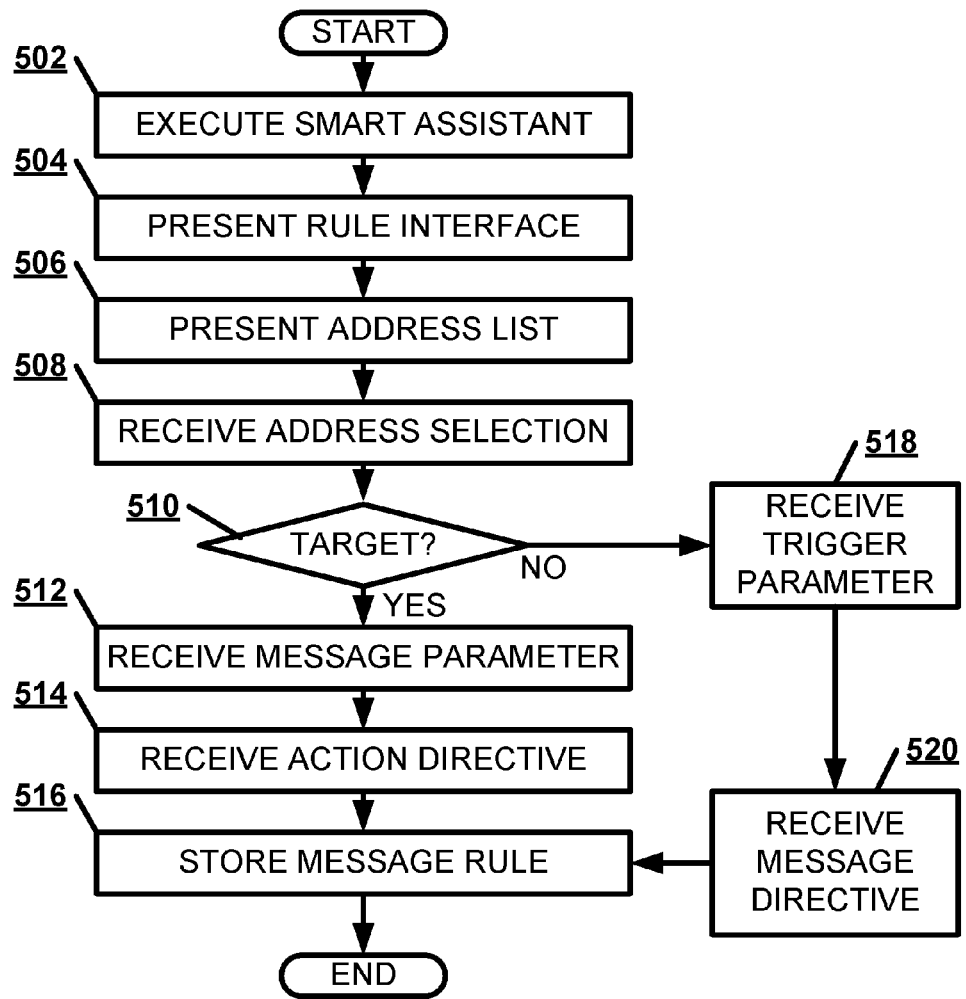
FIG. 5 illustrates, in a flowchart, one example of a method for establishing a message settings using a message rule user interface.

FIG. 5 illustrates, in a flowchart, one example of a method 500 for establishing a message settings using a smart assistant module. The mobile message device may execute a smart assistant module to present a message rule user interface (Block 502). The mobile message device may present a message rule user interface to the user to establish a message rule, such as a message target rule or a message source rule, associating a parameter, such as a message parameter or a trigger parameter, with a directive, such as a response action directive or a message directive (Block 504). The message rule user interface may present an address list to the user to allow selection of a source address or a target address (Block 506). The message rule user interface may receive an address selection on the address list from the user (Block 508).

If the user has selected a target rule for the message rule (Block 510), the message rule user interface may receive from a user a message parameter describing at least one of a message format and a message content of a hypothetical mobile message received in a mobile messaging module (Block 512). The message rule user interface may receive from the user a response action directive describing a device action to be performed by the mobile message device in response to receiving an incoming mobile message matching the message parameter (Block 514). The message rule user interface may store a message target rule associating the message parameter with the response action directive (Block 516).

If the user has selected a source rule for the message rule (Block 510), the message rule user interface may receive from a user a trigger parameter describing a hypothetical meta device event occurring internal to the mobile message device (Block 518). The message rule user interface may receive from the user a message directive describing an outgoing mobile message to be sent upon an occurrence of a meta device event matching the trigger parameter (Block 520). The message rule user interface may store a message source rule associating the trigger parameter with the message directive (Block 516).

Figure 6:
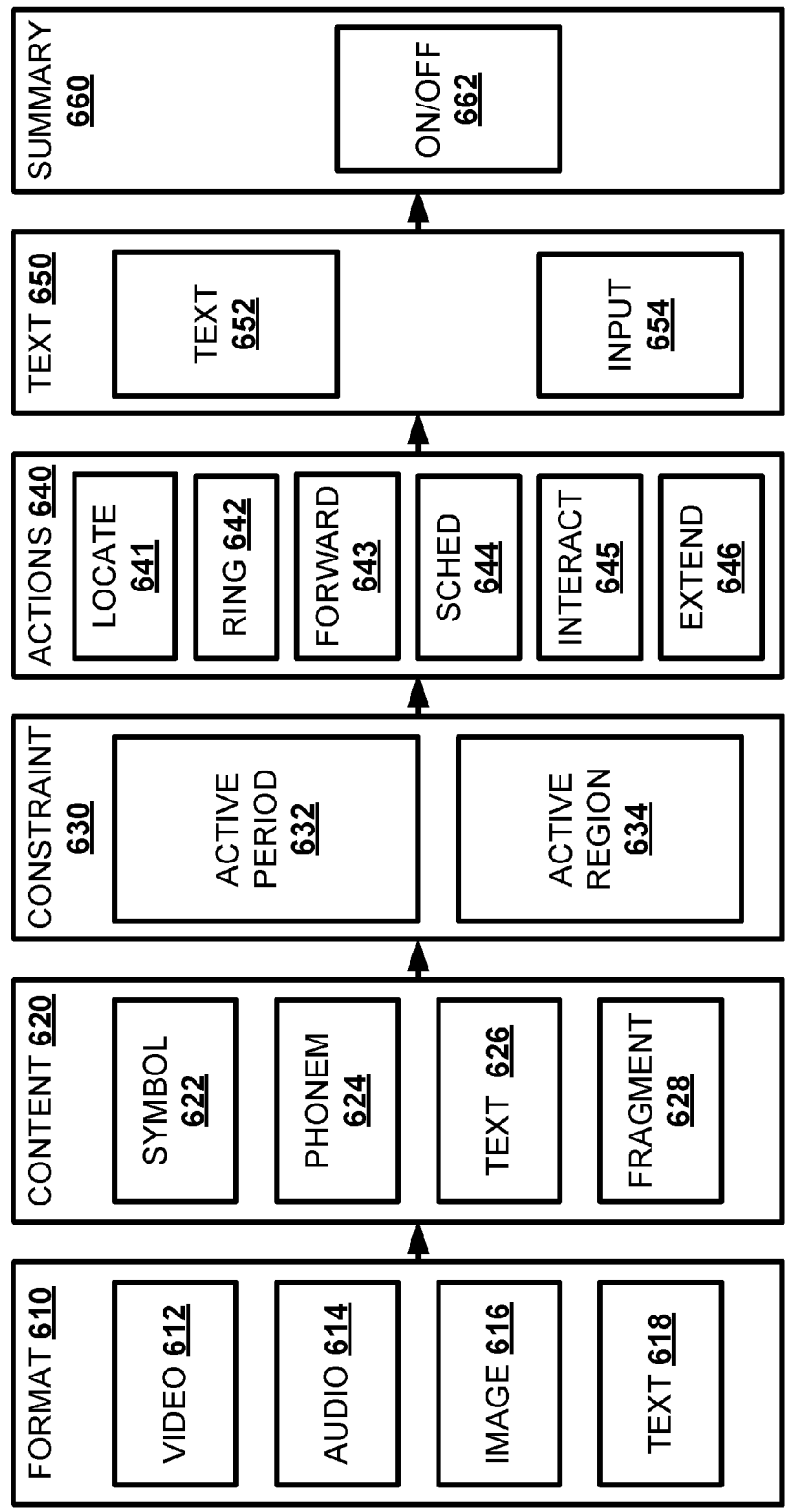
FIG. 6 illustrates, in a block diagram, one example of a message target user interface.

If the user selects a message target rule, the smart assistant module may present a message target user interface. FIG. 6 illustrates, in a block diagram, one example of a message target user interface 600. The message target user interface 600 may present one or more message parameter checklists to receive from the user a message parameter describing a hypothetical mobile message received in a mobile messaging module. The message target user interface 600 may present a format checklist 610 to the user to receive from the user a message format description of the hypothetical mobile message. The format checklist 610 may list one or more multimedia service formats, such as a video format 612, an audio format 614, and an image format 616. The format checklist 610 may list a short message service format, such as a text format 618.

The message target user interface 600 may present a content checklist 620 to the user to receive from the user a message content description of the hypothetical mobile message. The content checklist 620 may suggest a symbol 622 found in a video message, an image message, or a text message. The content checklist 620 may suggest a phonem 624, or verbal fragment, found in a video message or an audio message. The content checklist 620 may suggest a text string 626 describing a text message or a text fragment string 628 describing part of a text message. By presenting a suggested content checklist 620, various users may be guided towards including specific items in incoming mobile messages. Alternately, the content checklist 620 may receive a custom symbol 622, a custom phonem 624, a custom text string 626, or a custom text fragment string 628 input by the user.

The message target user interface 600 may present a constraint page 630 to the user to receive a constraint limiting the circumstances under which the incoming mobile message may result in a response action. The constraint page 630 may receive from the user an active period constraint 632 describing a time period when the message parameter is applied or not applied to an incoming mobile message. The constraint page 630 may receive from the user an active location constraint 634 describing a region where the message parameter is applied or not applied to an incoming mobile message.

The message target user interface 600 may present an action directive checklist 640 to receive a response action directive describing a device action to be performed by the mobile message device in response to receiving an incoming mobile message matching the message parameter. The action directive checklist 640 may have a location listing 641 indicating identifying a device location. The action directive checklist 640 may have a ring listing 642 indicating causing the mobile message device to ring. The action directive checklist 640 may have a forwarding listing 643 indicating forwarding an incoming mobile message. The action directive checklist 640 may have a schedule listing 644 indicating scheduling a meeting with the user. The action directive checklist 640 may have an interaction listing 645 indicating interacting with a smart assistant module. The action directive checklist 640 may have an extension listing 646 allowing the user to select an extension module to perform a device action additional to those currently provided by the action directive checklist 640. The action directive checklist 640 may open a search tree for the user to find the extension module in the mobile message device. The extension module may be developed by a publisher external to the publisher of the mobile messaging module or the smart assistant module.

The message target user interface 600 may present an accompanying text page 650 to receive an accompanying text to be sent in conjunction with the device action. The accompanying text page 650 may present a set of pre-populated accompanying texts 652 for selection by the user. The accompanying text page 650 may have a text input 654 to receive an accompanying text to be sent in conjunction with the device action.

The message target user interface 600 may present a summary page 660 to the user. The summary page 660 may show the message parameter and the response action directive to the user. The summary page 600 may have a virtual on/off switch 662 allowing the user to activate or deactivate the message target rule.

Figure 7:
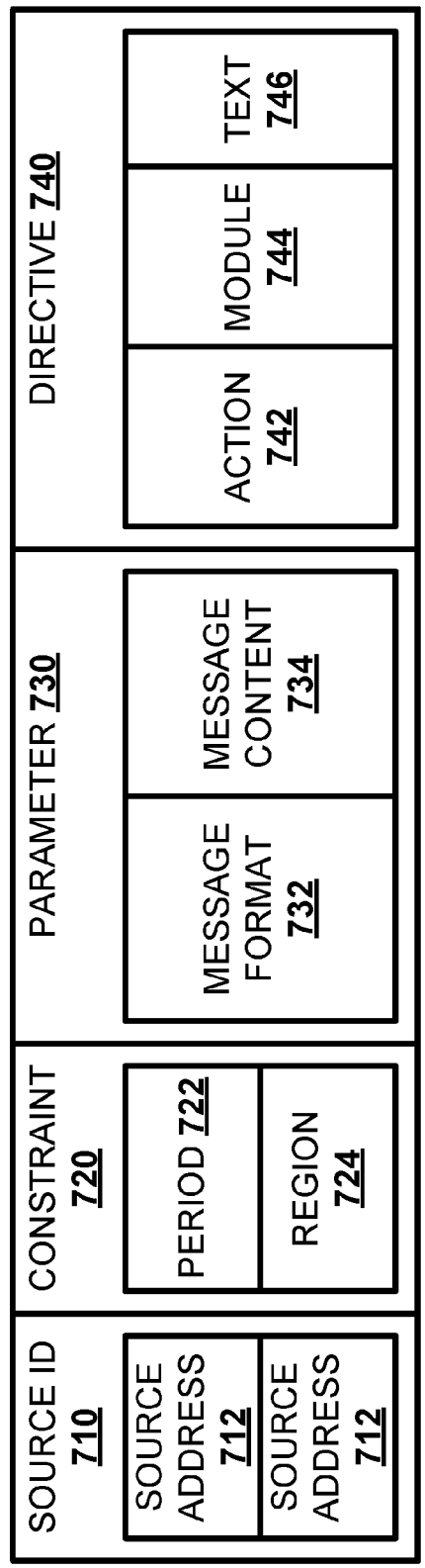
FIG. 7 illustrates, in a block diagram, one example of a message target rule.

FIG. 7 illustrates, in a block diagram, one example of a message target rule 700. The message target rule 700 may have a source identifier 710 indicating a source user sending an incoming mobile message. The source identifier 710 may be associated with one or more source addresses 712 for different devices associated with the source user.

The message target rule 700 may have a constraint field 720 describing a constraint limiting when the message parameter is applied. The constraint field 720 may denote an active period constraint 722 describing a time period when the message parameter is applied. The constraint field 720 may denote an active location constraint 724 describing a region where the message parameter is applied. The message target rule 700 may have a message parameter field 730 describing a hypothetical mobile message received in a mobile messaging module. The message parameter field 730 may have a message format sub-field 732 describing the format of the hypothetical mobile message. The message parameter field 730 may have a message content sub-field 734 describing the content of the hypothetical mobile message.

The message target rule 700 may have a response action directive field 740 describing a device action to be performed by the mobile message device in response to receiving an incoming mobile message matching the message parameter. The response action directive field 740 may have an action sub-field 742 describing the device action. The response action directive field 740 may have a module field 744 identifying the application module to perform the device action. The smart assistant module may select the application module optimally suited for performing the device action or the user may select the application module. The response action directive field 740 may have an accompanying text field 746 listing any accompanying texts to be sent in conjunction with the device action.

Figure 8:
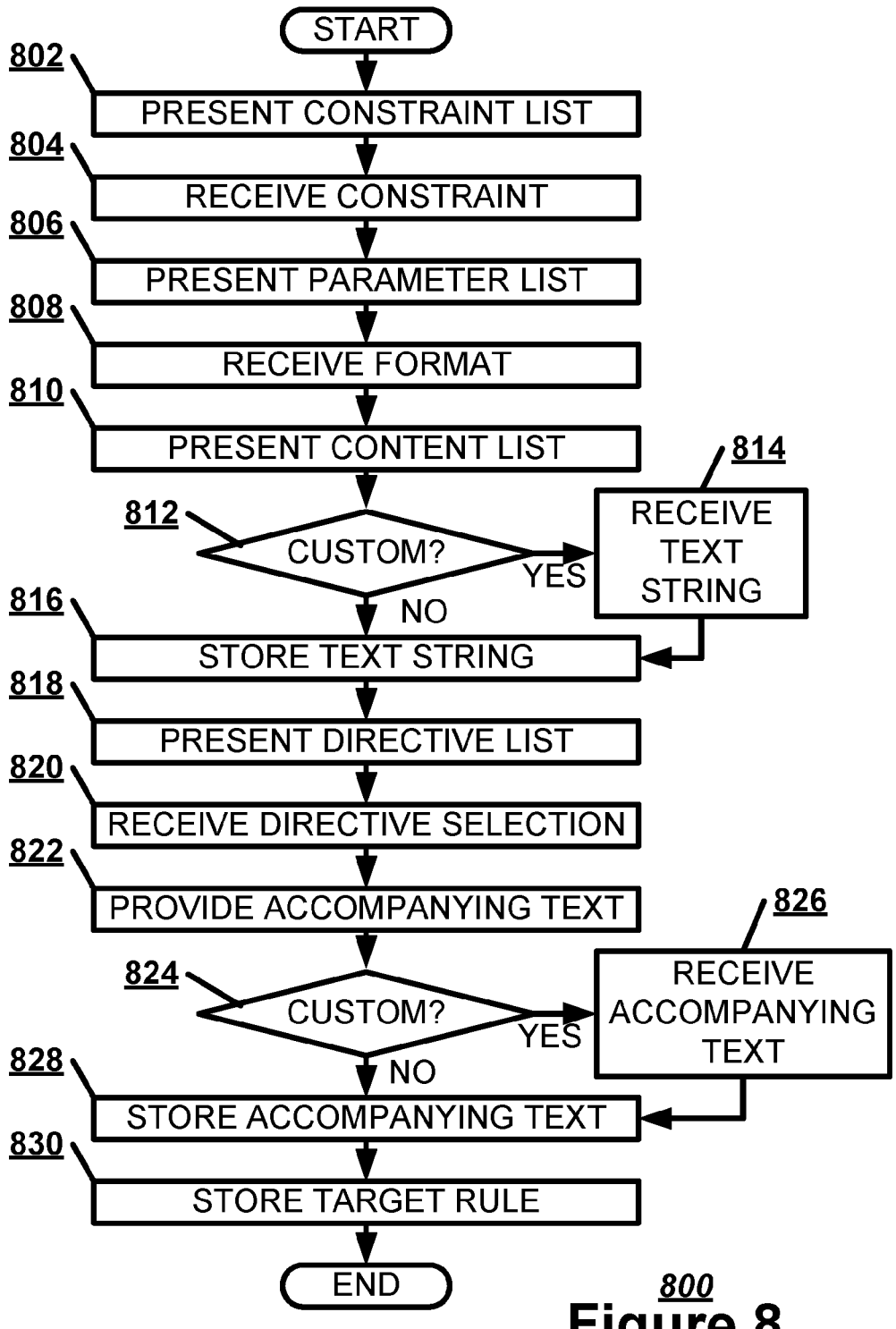
FIG. 8 illustrates, in a flowchart, one example of a method for establishing a message target rule using a message target user interface.

FIG. 8 illustrates, in a flowchart, one example of a method 800 for establishing a message target rule using a smart assistant module. The smart assistant module may present a constraint list describing one or more limitations on the application of the message parameter (Block 802). The smart assistant module may receive a constraint from the user, such as an active period constraint describing a time period when the message parameter is applied or an active location constraint describing a region where the message parameter is applied (Block 804).

The smart assistant module may present a message parameter checklist to receive a message parameter describing at least one of a message format and a message content of a hypothetical mobile message received in a mobile messaging module (Block 806). The smart assistant module may receive a message format for the hypothetical mobile message from the user (Block 808). The smart assistant module may present a content list providing a text string to the user describing a text or a text fragment for selection as the message content (Block 810). If the user opts to enter a custom text string (Block 812), the smart assistant module may receive a text string from the user describing a text or a text fragment of the incoming mobile message (Block 814). The smart assistant module may store the text string within the message parameter (Block 816).

The smart assistant module may present an action directive checklist to receive the response action directive describing at least one of identifying a device location, causing the mobile message device to ring, forwarding the incoming mobile message, scheduling a meeting with the user, interacting with a smart assistant module, and activating an extension module added to the action directive checklist by the user (Block 818). The smart assistant module may receive a response action directive selection from the user (Block 820). The smart assistant module may provide a pre-populated accompanying text to be sent in conjunction with the device action to the user for selection (Block 822). If the user opts to enter a custom accompanying text (Block 824), the smart assistant module may receive an accompanying text to be sent in conjunction with the device action (Block 826). The smart assistant module may store the accompanying text in the response action directive (Block 828). The smart assistant module may store the message target rule (Block 830).

Figure 9:
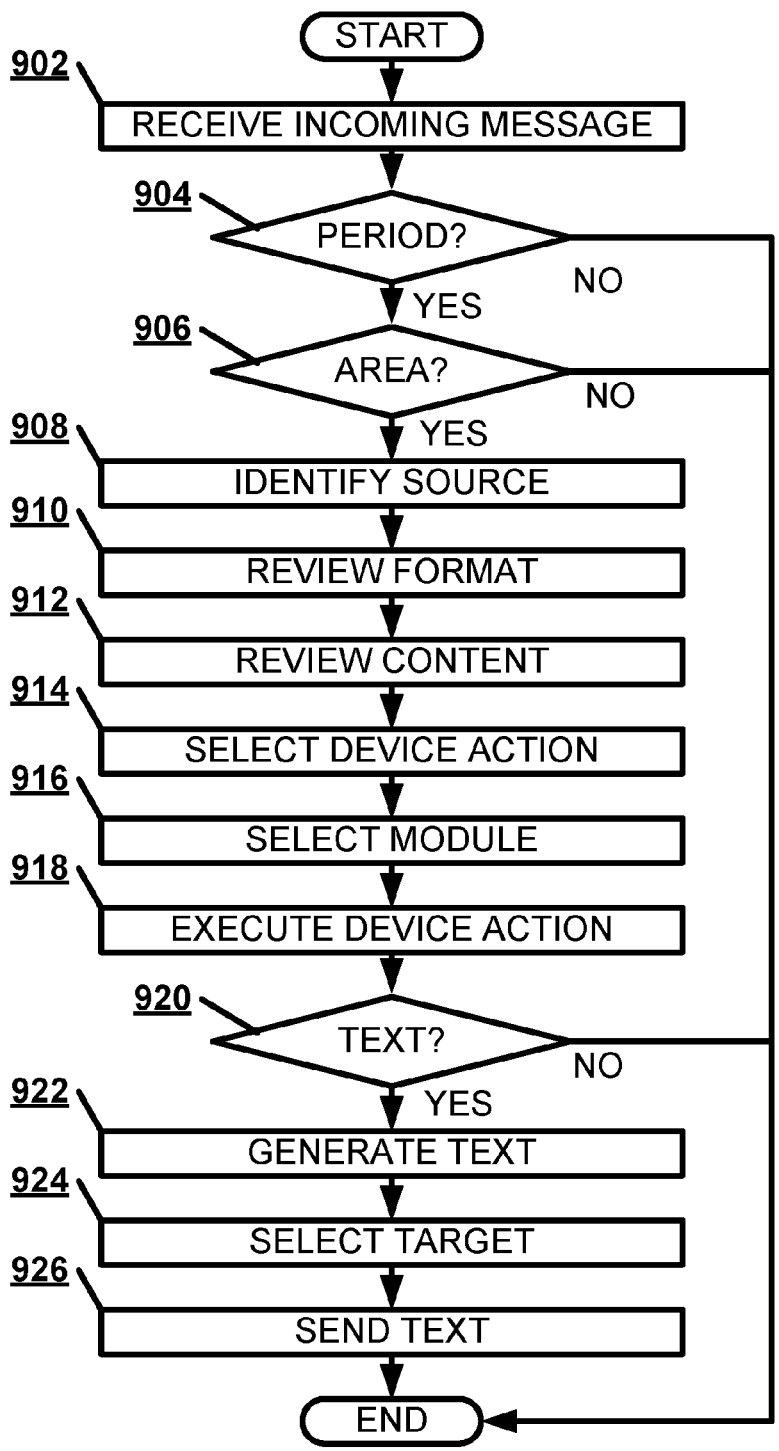
FIG. 9 illustrates, in a flowchart, one example of a method for executing a device action using a smart assistant module.

FIG. 9 illustrates, in a flowchart, one example of a method 900 for executing a device action using a smart assistant module. A mobile messaging module may receive an incoming mobile message matching the message parameter (Block 902). If the message is received within an active period (Block 904), and the mobile message device is at an active location (Block 906), the smart assistant module may identify a source that sent an incoming mobile message (Block 908). The smart assistant module may review the message format of the incoming mobile message in comparison to the message parameter (Block 910). The smart assistant module may review the message content of the incoming mobile message in comparison to the message parameter (Block 912). The smart assistant module may select a device action based on a response action directive associated with the message parameter (Block 914). The smart assistant module may select an application module to execute the device action based on response action directive (Block 916). The selected application module may execute the device action in response to the incoming mobile message according to the response action directive (Block 918).

If the response action directive indicates an accompanying text is to be sent (Block 920), the smart assistant module may generate an accompanying text based on the response action directive (Block 922). The smart assistant module may select a target for the accompanying text based on the response action directive (Block 924). The mobile messaging module may send the accompanying text to the target (Block 926)

Figure 10:
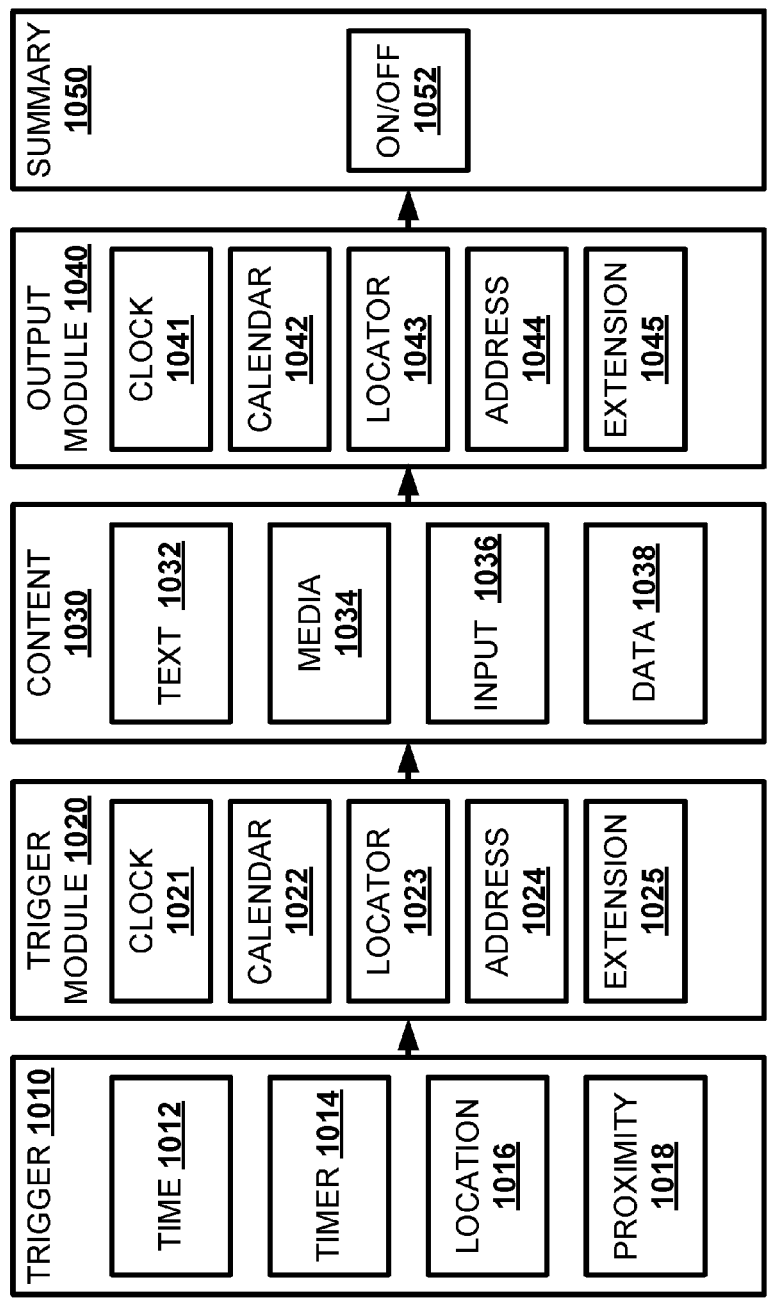
FIG. 10 illustrates, in a block diagram, one example of a message source user interface.

If the user selects a message source rule, the smart assistant module may present a message source user interface. FIG. 10 illustrates, in a block diagram, one example of a message source user interface 1000. The message source user interface 1000 may present a trigger parameter checklist 1010 to the user to receive a trigger parameter. The trigger parameter checklist 1010 may list a time trigger parameter 1012 describing a specific time, a timer trigger parameter 1014 describing the expiration of a timer, a location trigger parameter 1016 describing a location, and a proximity trigger parameter 1018 describing the proximity of the mobile message device to a different mobile message device.

The message source user interface 1000 may present a trigger module checklist 1020 to allow a user to select an application module to identify a meta device event. The trigger module checklist 1020 may identify recommended application modules based on the selected trigger parameter. The trigger module checklist 1020 may present a clock module 1021 for selection to identify a time or the expiration of a timer, so that a reminder message for an event may be sent at a given time. The trigger module checklist 1020 may present a calendar module 1022 to identify a time and date, so that a reminder message may be triggered by an upcoming meeting. The trigger module checklist 1020 may present a location service module 1023 to identify a location, so that an information message may be sent to a spouse upon leaving one location and heading to another. The trigger module checklist 1020 may present an address book module 1024, for use in determining an associate for purposes of sending a meetup inquiry. The trigger module checklist 1020 may present an extension module 1025 to select an application module not currently presented by the trigger module checklist 1020. The trigger module checklist 1020 may open a search tree for the user to find the extension module in the mobile message device. The extension module may be developed by a publisher external to the publisher of the mobile messaging module or the smart assistant module.

The message source interface 1000 may present to the user a content page 1030 describing content for inclusion in the outgoing mobile message. The content page 1030 may provide a text string 1032 describing a text or text fragment for selection for inclusion in the outgoing message. The content page 1030 may provide a media thumbnail 1034 describing a media item for selection for inclusion in the outgoing message. The content page 1030 may have an input form 1036 to receive a media item identifier or a text string from the user describing a text or a text fragment to include in the outgoing mobile message. The content page 1030 may have a data output checkbox 1038 indicating data output from an application module is to be included in the outgoing mobile message.

The message source user interface 1000 may present an output module checklist 1040 to identify for selection by a user an application module to provide a data output for inclusion with the outgoing mobile message. The output module checklist 1040 may present a clock module 1041 to produce a time of the message. The output module checklist 1040 may present a calendar module 1042 to upcoming meeting data. The output module checklist 1040 may present a location service module 1043 to present a location of the mobile message device to a message recipient. The output module checklist 1040 may present an address book module 1044 to identify meeting participant contact information or to calculate proximity in conjunction with the locations service module 1026. The output module checklist 1040 may present an extension module 1045 to select an application module not currently presented by the output module checklist 1040. The output module checklist 1040 may open a search tree for the user to find the extension module in the mobile message device. The extension module may be developed by a publisher external to the publisher of the mobile messaging module or the smart assistant module.

The message source user interface 1000 may present a summary page 1050 to the user. The summary page 1050 may show the trigger parameter and the message directive to the user. The summary page 1050 may have a virtual on/off switch 1052 allowing the user to activate or deactivate the message source rule.

Figure 11:
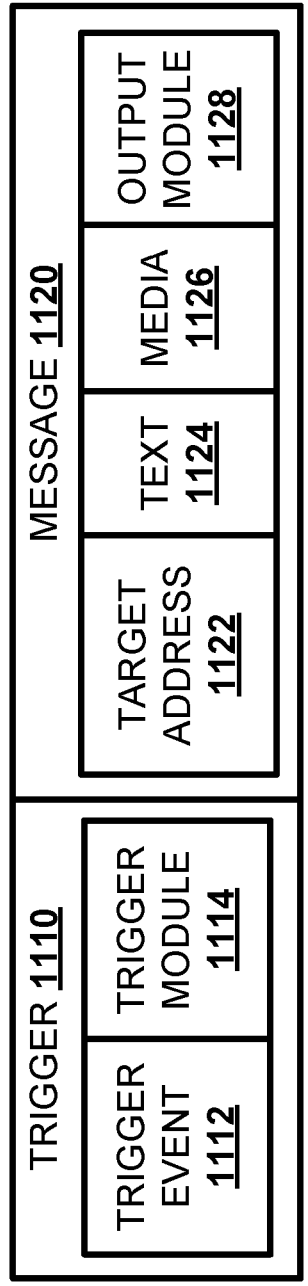
FIG. 11 illustrates, in a block diagram, one example of a message source rule.

FIG. 11 illustrates, in a block diagram, one example of a message source rule 1100. The message source rule 1100 may have a trigger parameter 1110 describing a hypothetical meta device event occurring internal to the mobile message device. The trigger parameter 1110 may have a trigger event field 1112 describing the hypothetical meta device event. The trigger parameter 1110 may have a trigger module identifier 1114 indicating an application module to identify that a meta device event matching the trigger parameter event has occurred.

The message source rule 1100 may have a message directive 1120 describing an outgoing mobile message to be sent upon occurrence of the meta device event matching the trigger parameter. The message directive 1120 may have a target address 1122 identifying the user receiving the outgoing mobile message. The message directive 1120 may have a text field 1124 describing a text or a text fragment to include in the outgoing mobile message. The message directive 1120 may have a media field 1126 identifying a media item to embed in the outgoing mobile message. The message directive 11120 may have an output module identifier 1128 indicating an application module to produce a data output for inclusion in the outgoing mobile message.

Figure 12:
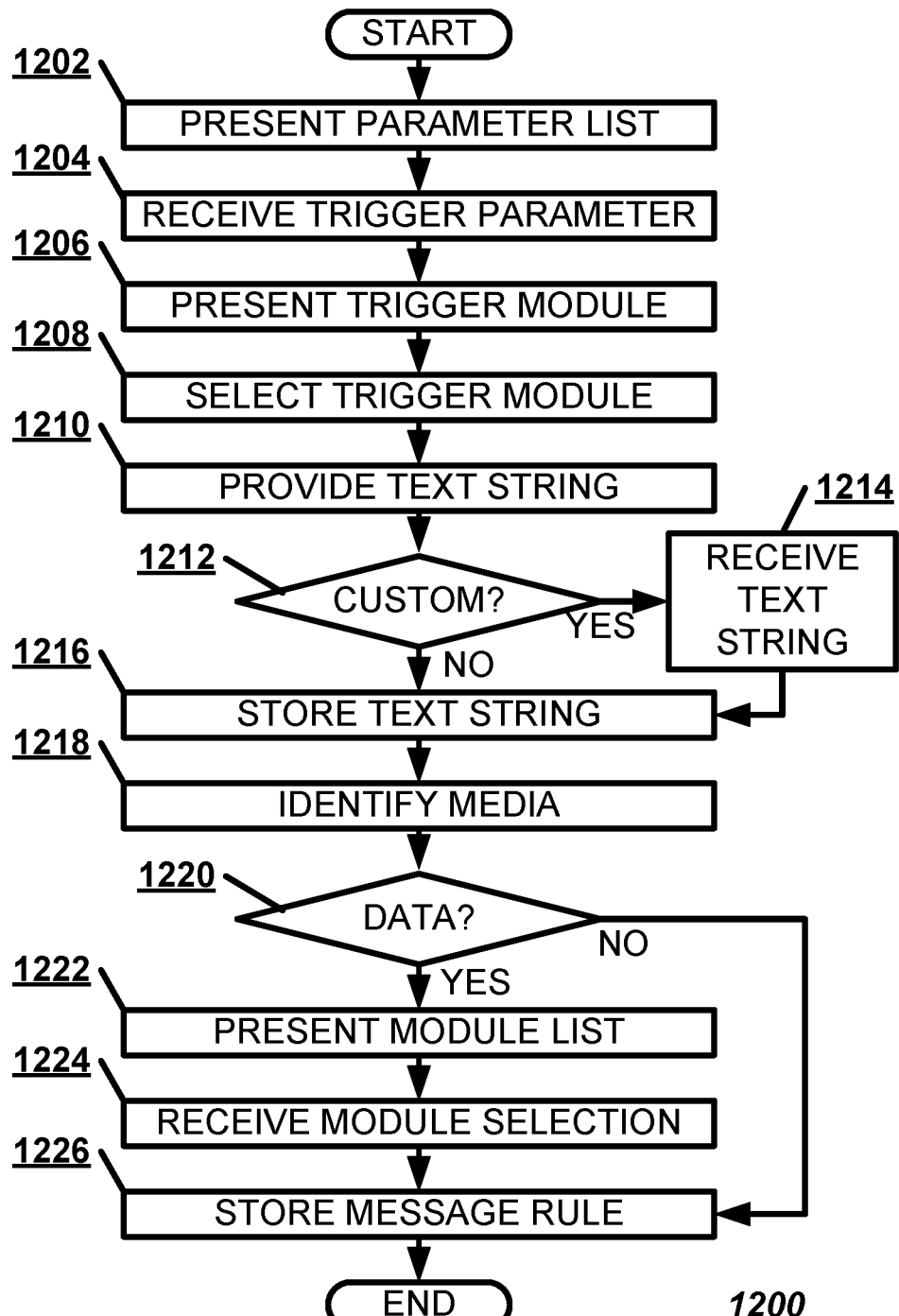
FIG. 12 illustrates, in a flowchart, one example of a method for establishing a message source rule using a message source user interface.

FIG. 12 illustrates, in a flowchart, one example of a method 1200 for establishing a message source rule using a smart assistant module. The smart assistant module may present a trigger parameter checklist to receive a trigger parameter describing a hypothetical meta device event occurring internal to the mobile message device (Block 1202). The smart assistant module may receive from the user at least one of a time trigger parameter describing a time, a timer trigger parameter describing an expiration of a timer, a location trigger parameter describing a location, a proximity trigger parameter describing a proximity to a different mobile message device as the trigger parameter, and an extension trigger parameter describing a custom trigger event entered by the user (Block 1204). The smart assistant module may present a trigger module checklist providing a set of application module options to identify the meta device event (Block 1206). The smart assistant module may select an application module from the trigger module checklist based on user input to identify the meta device event (Block 1208).

The smart assistant module may provide a text string to the user describing at least one of a text and a text fragment for selection for inclusion in the outgoing message (Block 1210). If the user opts to enter a custom text string (Block 1212), the smart assistant module may receive a text string from the user describing a text or a text fragment to include in the outgoing mobile message (Block 1214). The smart assistant module may store the text string with in the message directive (Block 1216). The smart assistant module may identify a media item selected by the user for embedding in the outgoing mobile message (Block 1218).

If the user opts to include a data output in the outgoing mobile message (Block 1220), the smart assistant module may present an output module checklist to identify an application module to provide a data output for inclusion with the outgoing mobile message (Block 1222). The smart assistant module may receive an output module selection from the user indicating the application module to provide the data output (Block 1224). The smart assistant module may store the message source rule (Block 1226).

Figure 13:
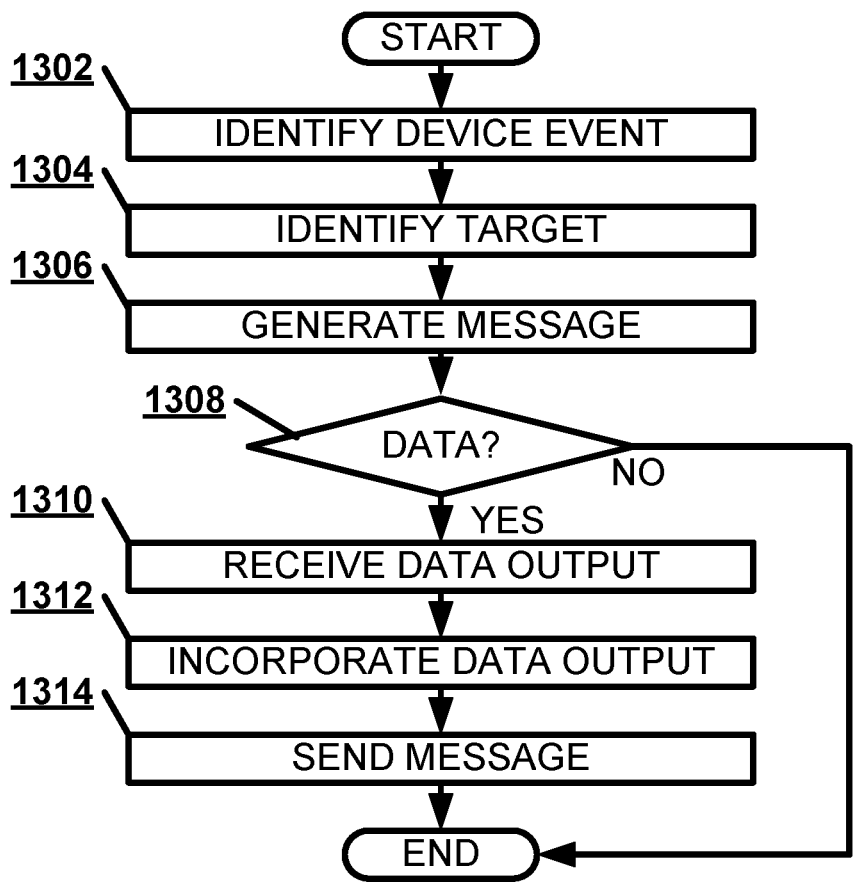
FIG. 13 illustrates, in a flowchart, one example of a method for executing a triggered mobile message using a smart assistant module.

FIG. 13 illustrates, in a flowchart, one example of a method 1300 for executing a triggered mobile message using a smart assistant module. An application module may identify an occurrence of a meta device event matching a trigger parameter (Block 1302). The smart assistant module may identify a target address to receive the outgoing mobile message (Block 1304). The smart assistant module may generate an outgoing mobile message based on the message directive associated with the trigger parameter (Block 1306).

If the user opted to include a data output in the outgoing mobile message (Block 1308), the smart assistant module may receive a data output from at least one of a clock module, a calendar module, a location service module, an address book module, and an extension module for inclusion with the outgoing mobile message (Block 1310). The smart assistant module may incorporate the data output into the outgoing mobile message (Block 1312). The selected application module may send the outgoing mobile message to the identified target upon the occurrence of the meta device event according to the message directive (Block 1314).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Examples may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

I claim:

1. A mobile message device, comprising:
   an output device configured to present a message rule user interface to the user to establish a message rule;
   an input device configured to receive from a user via the message rule user interface a message parameter describing at least one of a message format and a message content of a hypothetical mobile message received in a mobile messaging module and a response action directive describing a device action selected from a plurality of device actions to be performed by the mobile message device in response to receiving an incoming mobile message matching the message parameter;
   memory configured to store a message target rule associating the message parameter with the response action directive;
   a communication interface configured to receive the incoming mobile message matching the message parameter; and
   a processing core having at least one processor configured to execute the device action in response to the incoming mobile message according to the response action directive.

2. The mobile message device of claim 1, wherein the processing core is further configured to implement a smart assistant module to present a message rule user interface.

3. The mobile message device of claim 1, wherein the input device is further configured to receive from the user at least one of an active period parameter describing a time period when the message parameter is applied and an active location parameter describing a region where the message parameter is applied.

4. The mobile message device of claim 1, wherein the output device is further configured to present an address list to the user to allow selection of a source address.

5. The mobile message device of claim 1, wherein the processing core is further configured to identify a source that sent the incoming mobile message.

6. The mobile message device of claim 1, wherein the processing core is further configured to select an application module to execute the device action based on the response action directive.

7. The mobile message device of claim 1, wherein the output device is further configured to present a message parameter checklist to receive the message parameter.

8. The mobile message device of claim 1, wherein the input device is further configured to receive a text string from the user describing at least one of a text and a text fragment of the incoming mobile message.

9. The mobile message device of claim 1, wherein the output device is further configured to provide a text string to the user describing at least one of a text and a text fragment for selection as the message content.

10. The mobile message device of claim 1, wherein the output device is further configured to present an action directive checklist to receive the response action directive describing at least one of identifying a device location, causing the mobile message device to ring, forwarding the incoming mobile message, scheduling a meeting with the user, interacting with a smart assistant module, and activating an extension module added to the action directive checklist by the user.

11. The mobile message device of claim 1, wherein the input device is further configured to receive an accompanying text to be sent in conjunction with the device action.

12. The mobile message device of claim 1, wherein the input device is further configured to receive from the user via the message rule user interface a trigger parameter from a user describing a hypothetical meta device event occurring internal to the mobile message device and a message directive describing an outgoing mobile message to be sent upon an occurrence of a meta device event matching the trigger parameter.

13. A computing device, having a memory to store a series of instructions that are executed by at least one processor to implement a smart assistant module, the computing device configured to present a message rule user interface to the user with the smart assistant module to establish a message source rule;
   receive from a user via the message rule user interface a trigger parameter describing a hypothetical meta device event occurring internal to the computing device;
   receive from the user via the message rule user interface a message directive describing an outgoing mobile message selected from a plurality of outgoing mobile messages to be sent upon an occurrence of a meta device event matching the trigger parameter;
   store a message source rule associating the trigger parameter with the message directive;
   identify the occurrence of the meta device event matching the trigger parameter; and
   send the outgoing mobile message upon the occurrence of the meta device event according to the message directive.

14. The computing device of claim 13, wherein the computing device is further configured to
   present an address list to the user to allow selection of a target address.

15. The computing device of claim 13, wherein the computing device is further configured to
   receive from the user at least one of a time trigger parameter describing a time, a timer trigger parameter describing an expiration of a timer, a location trigger parameter describing a location, a proximity trigger parameter describing a proximity to a different mobile message device as the trigger parameter, and an extension trigger parameter describing a custom trigger event entered by the user.

16. The computing device of claim 13, wherein the computing device is further configured to
   select an application module to identify the meta device event.

17. The computing device of claim 13, wherein the computing device is further configured to
   receive a text string from the user describing at least one of a text and a text fragment to include in the outgoing mobile message.

18. The computing device of claim 13, wherein the computing device is further configured to
   incorporate a data output from at least one of a clock module, a calendar module, a location service module, an address book module, and an extension module into the outgoing mobile message.

19. A machine-implemented method, comprising:
   presenting a message rule user interface with a smart assistant module to the user to establish a message target rule;
   receiving in a mobile message device from a user via the message rule user interface a message parameter describing at least one of a message format and a message content of a hypothetical mobile message received in a mobile messaging module;

receiving from the user via the message rule user interface a response action directive describing a device action selected from a plurality of device actions to be performed by the mobile message device in response to receiving an incoming mobile message matching the message parameter;

store a message target rule associating the message parameter with the response action directive;

receiving an incoming mobile message matching the message parameter; and executing the device action in response to the incoming mobile message according to the response action directive.

20. The method of claim 19, further comprising:

presenting an action directive checklist to receive the response action directive describing at least one of identifying a device location, causing the mobile message device to ring, forwarding the incoming mobile message, scheduling a meeting with the user, interacting with a smart assistant module, and activating an extension module added to the action directive checklist by the user.

* * * * *